(12) United States Patent
Zhang et al.

(10) Patent No.: US 11,095,522 B2
(45) Date of Patent: Aug. 17, 2021

(54) DYNAMIC SCALING FOR DATA PROCESSING STREAMING SYSTEM

(71) Applicant: Microsoft Technology Licensing, LLC, Redmond, WA (US)

(72) Inventors: Xindi Zhang, Kirkland, WA (US); Boris Shulman, Sammamish, WA (US); Alexander Alperovich, Redmond, WA (US); Patrick Chung, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/547,399

(22) Filed: Aug. 21, 2019

(65) Prior Publication Data

US 2021/0058298 A1   Feb. 25, 2021

(51) Int. Cl.
*H04L 29/06* (2006.01)
*H04L 12/24* (2006.01)

(52) U.S. Cl.
CPC .............. *H04L 41/12* (2013.01); *H04L 65/60* (2013.01)

(58) Field of Classification Search
None
See application file for complete search history.

(56) References Cited

U.S. PATENT DOCUMENTS

| | | | |
|---|---|---|---|
| 7,902,866 B1 * | 3/2011 | Patterson | G06F 30/34 326/41 |
| 9,098,350 B2 * | 8/2015 | Gedik | G06F 9/5083 |
| 10,050,838 B1 * | 8/2018 | Hart | H04W 8/005 |
| 10,191,881 B2 * | 1/2019 | Goh | G06F 13/4068 |
| 10,353,677 B2 * | 7/2019 | Cook | G06F 8/451 |
| 2005/0262254 A1 * | 11/2005 | Sherwani | H04L 29/06027 709/231 |
| 2008/0295111 A1 | 11/2008 | Craft et al. | |
| 2009/0319762 A1 * | 12/2009 | Hanai | G06F 9/3885 712/233 |

(Continued)

FOREIGN PATENT DOCUMENTS

WO   WO-2017032212 A1 *   3/2017   ............. H04L 29/00

OTHER PUBLICATIONS

A. Azgin, R. Ravindran and G. Wang, "On-demand mobility support with anchor chains in information centric networks," 2017 IEEE International Conference on Communications (ICC), Paris, 2017, pp. 1-7, doi: 10.1109/ICC.2017.7997210. (Year: 2017).*

(Continued)

*Primary Examiner* — Uzma Alam
(74) *Attorney, Agent, or Firm* — Rainier Patents, P.S.

(57) ABSTRACT

Described herein is a system and method for dynamically scaling a stream processing system (e.g., "exactly once" data stream processing system). Various parameter(s) (e.g., user-configurable capacity, real-time load metrics, and/or performance counters) can be used to dynamically scale in and/or scale out the "exactly once" stream processing system without system restart. Delay introduced by this scaling operation can be minimized by utilizing a combination of mutable process topology (which can dynamically assign certain parts of the system to a new host machine) and controllable streaming processor movement with checkpoints and the streaming protocol controlled recovery which still enforces the "exactly once" delivery metric.

20 Claims, 7 Drawing Sheets

(56) References Cited

U.S. PATENT DOCUMENTS

| | | | |
|---|---|---|---|
| 2010/0002577 A1* | 1/2010 | Moreno | H04L 41/12 |
| | | | 370/221 |
| 2012/0282951 A1* | 11/2012 | Nguyen | H04N 21/4788 |
| | | | 455/457 |
| 2014/0164628 A1* | 6/2014 | Branson | G06F 9/54 |
| | | | 709/227 |
| 2015/0026347 A1* | 1/2015 | Qian | G06F 9/505 |
| | | | 709/226 |
| 2016/0248688 A1* | 8/2016 | Barsness | G06F 16/24568 |
| 2016/0261727 A1* | 9/2016 | Yang | H04L 65/4069 |
| 2016/0359940 A1* | 12/2016 | Chen | H04L 65/604 |
| 2017/0308581 A1* | 10/2017 | Han | G06F 17/30958 |
| 2017/0366395 A1* | 12/2017 | Goldfarb | H04L 12/4641 |
| 2018/0124141 A1* | 5/2018 | Lewis | H04N 21/26258 |
| 2018/0337977 A1* | 11/2018 | Crawford | H04L 41/12 |
| 2019/0098363 A1* | 3/2019 | Hertzfeld | H04N 21/47214 |
| 2019/0130004 A1 | 5/2019 | Singh et al. | |
| 2019/0140914 A1* | 5/2019 | Maes | H04L 41/22 |
| 2019/0213084 A1 | 7/2019 | Cook et al. | |

OTHER PUBLICATIONS

Akidau, et al., "MillWheel: Fault-Tolerant Stream Processing at Internet Scale", In Proceedings of the VLDB Endowment, vol. 6, Issue 11, Aug. 26, 2013, pp. 1033-1044.

"International Search Report and Written Opinion Issued in PCT Application No. PCT/US20/037679", dated Sep. 28, 2020, 15 Pages.

* cited by examiner

DYNAMIC SCALING FOR DATA PROCESSING STREAMING SYSTEM

BACKGROUND

Stream processing allows multiple data streams from multiple sources to be processed in real-time. "Streaming" or stream processing refers to receiving streams of data, processing the data by multiple processors and streaming the processed data back out as a single flow.

SUMMARY

Described herein is a system for dynamic scaling of a stream processing system, comprising: a processing system comprising a processor and a memory having computer-executable instructions stored thereupon which, when executed by the processor, cause the processing system to: receive a request to scale the stream processing system, the request identifying a node change of at least one current processor executing on a first computing node in a topology of the stream processing system; send a request to the at least one current processor to create a checkpoint that captures internal state of the at least one current processor; receive the checkpoint from the at least one current processor; send a request to initiate at least one new processor on a second computing node in the topology of the stream processing system, wherein the second computing node is different than the first computing node; send the received checkpoint to the at least one new processor; send a request to stop processing to the at least one current processor; and send a request to start processing to the at least one new processor, wherein exactly once processing of streaming data is preserved during dynamic scaling of the stream processing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
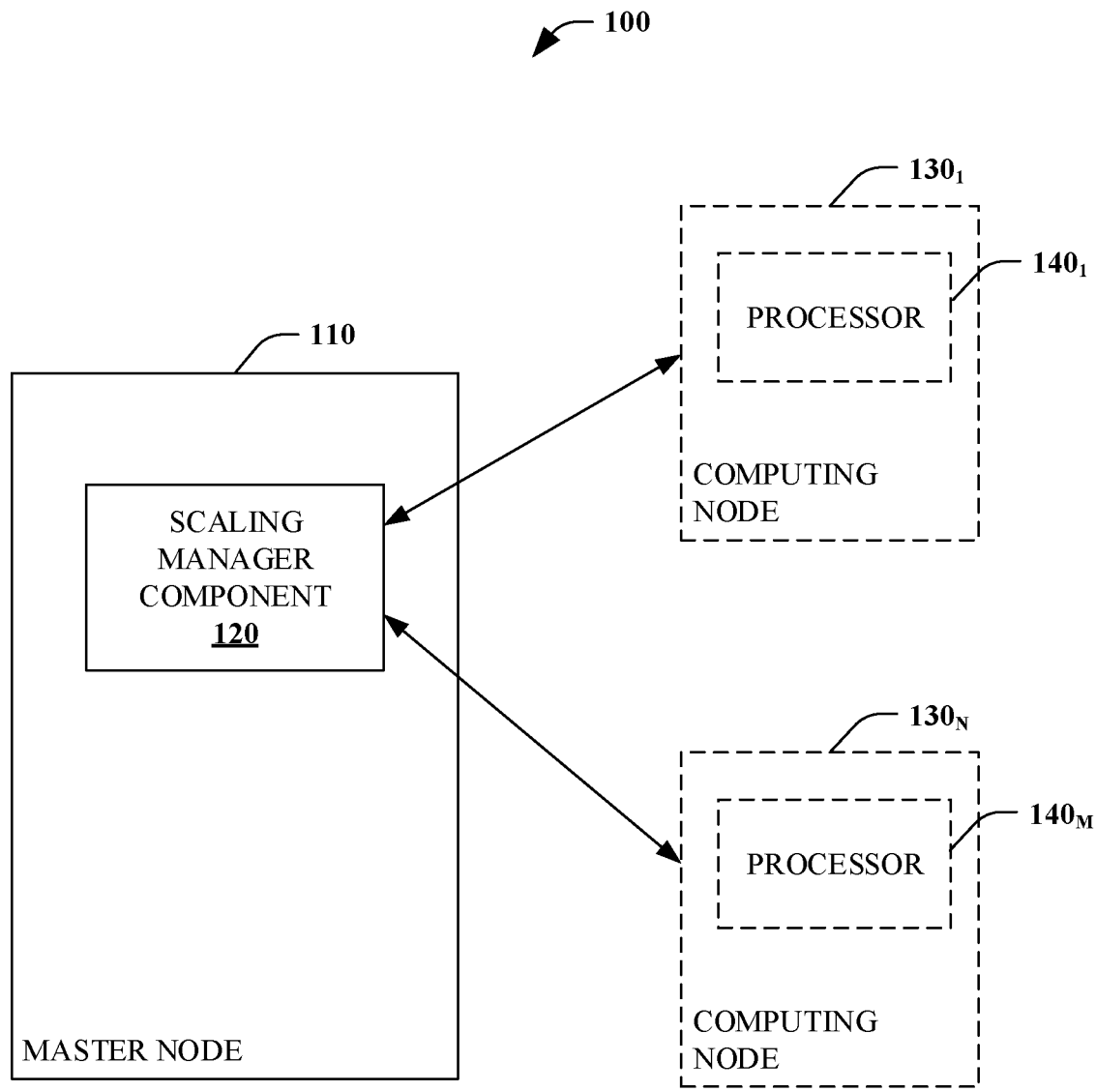
FIG. 1 is a functional block diagram that illustrates a system for dynamic scaling of a stream processing system.

Various technologies pertaining to dynamic scaling for an "exactly once" data stream processing system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding dynamic scaling for an "exactly once" data stream processing system. What follows are one or more exemplary systems and methods.

Aspects of the subject disclosure pertain to the technical problem of dynamic scaling for an "exactly once" stream processing system. The technical features associated with addressing this problem involve receiving a request to scale the stream processing system, the request identifying a node change of at least one current processor executing on a first computing node in a topology of the stream processing system; sending a request to the at least one current processor to create a checkpoint that captures internal state of the at least one current processor; receiving the checkpoint from the at least one current processor; sending a request to initiate at least one new processor on a second computing node in the topology of the stream processing system, wherein the second computing node is different than the first computing node; sending the received checkpoint to the at least one new processor; sending a request to stop processing to the at least one current processor; and sending a request to start processing to the at least one new processor, wherein exactly once processing of streaming data is preserved during dynamic scaling of the stream processing system. Accordingly, aspects of these technical features exhibit technical effects of more efficiently and effectively dynamically scaling a data stream processing system, for example, reducing consumption of network bandwidth and/or computing node processing resource(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

In some embodiments, the technologies disclosed herein are used in conjunction with pull-based stream processing employing anchor-based technology that facilitates once and only once processing by output processor(s). An "anchor" is generated by an input processor (e.g., along with data of an output stream) and describes a point in the output stream of the input processor, so that other unit(s) of data in the output stream are either before or after any given anchor. For purposes of discussion, data "flows" downstream from an input processor through any intermediate computing processor(s) to an output processor. A request for data is sent upstream from an output processor through any intermediate computing processor(s) to an input processor.

During normal operation, down-stream processors receive an anchor along with a batch of data. The anchor, generated by the input processor that generated the batch of data, is a pointer in the output stream reflecting the last portion of data included in the batch of data. Once a downstream processor (e.g., output processor) has received and processed the batch of data, the downstream processor can request another batch of data beginning with the anchor of batch of data last received/processed (e.g., indicative of the downstream processor having processed data up to the anchor). Conventionally, data streaming systems that promise "exactly once" generally hold various internal states and can be distributed across multiple host machines (e.g., nodes) thus making it difficult to scale in/out without restarting the system which causes interruptions to the critical real-time stream processing.

Described herein is a system and method for dynamically scaling a data stream processing system (e.g., "exactly once" data stream processing system). Various parameter(s) (e.g., user-configurable capacity, real-time load metrics, and/or performance counters) can be used to dynamically scale in and/or scale out the "exactly once" data stream processing system without system restart. In some embodiments, delay introduced by this scaling operation can be minimized by utilizing a combination of mutable process topology (which can dynamically assign certain parts of the system to a new host machine) and controllable streaming processor movement with checkpoints and the streaming protocol controlled recovery which still enforces the "exactly once" delivery metric.

Referring to FIG. 1, a system for dynamic scaling of a stream processing system 100 is illustrated. The system 100 can perform dynamically scaling of a data stream processing system (e.g., "exactly once" data stream processing system).

The system 100 includes a master node 110 having a scaling manager component 120. The master node 110 dynamically manages one or more computing nodes 130 based upon a particular topology at a given time. The master node 110 further manages one or more processors 140 on each computing node 130. In some embodiments, the master node 110 can assign processing task(s) to each of the one or more processors 140. In some embodiments, the topology can change in response to customer requirement(s) (e.g., financial, processing power, processing latency) and/or input.

The scaling manager component 120 manages workflow of the system 100 in conjunction with the master node 110. The scaling manager component 120 can orchestrate the dynamic addition and/or deletion of computing node(s) 130 to the system 100, identification of processor(s) 140 to be moved, and the movement of processor(s) 140 from a first computing node 130 to a second different computing node 130 while ensuring "exactly once" stream processing. In some embodiments, the scaling manager component 120 can monitor and communicate one or more of the following states: topology before and after scaling; monitor existing processors' checkpointing and shutdown; monitor when to start new processors' initiation and output; track the relation between a new marshaller and existing nodes; handle scale coordinator/master node failure and recovery; emit scaling status to a service/event monitor; and/or inject service fabric (SF) client to manage nodes creation and/or deletion.

Each processor 140 has a ready to initiate state and/or a ready to output state that can be managed by the scaling manager component 120. In some embodiments, to enhance the robustness of the scaling operation a configurable timeout to restart a particular computing node 130 if the particular computing node 130 cannot start processing within a predefined period of time.

In some embodiments, the scaling operation can trigger a topology update using the various parameter(s) from the current running topology and a scaling manager component 120 in the system 100 can manage the process by requesting affected processor(s) 140 to create a checkpoint to its current internal state while the other processors 140 continue to process as normal.

Once the checkpointing has been completed, the scaling manager component 120 can request new node(s) 130, if any, and/or new processor(s) 140 to be created and "warmup" using the newly created checkpoint(s). In some embodiments, while the new node(s) 130, if any, and/or processor(s) 140 are being warmed up, the existing processor(s) 140 continue to operate on real-time input data. Once the "warmup" completes in the new instances of the node(s) 130 and/or processor(s) 140, the existing processor(s) 140 are shut down and the new instance(s) of the processor(s) 140 resume processing from the last finished time (e.g., internal anchor).

Figure 2:
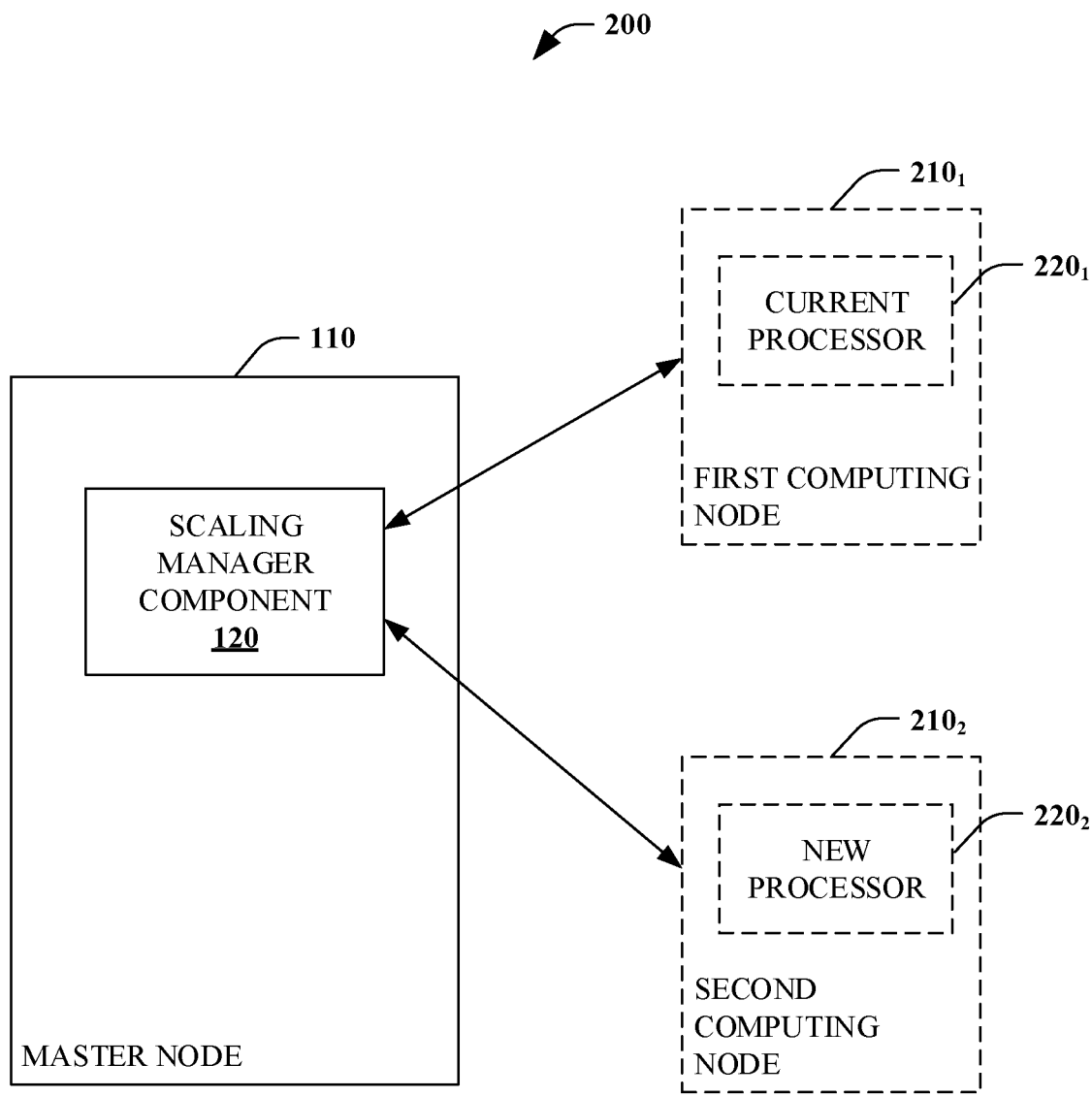
FIG. 2 is a functional block diagram that illustrates a system for dynamic scaling of a data stream processing system.

Referring to FIG. 2, a system for dynamic scaling of a data stream processing system 200 is illustrated. The system 200 includes the master node 110 and the scaling manager component 120, as discussed above.

The system 200 further includes a first computing node $210_1$ and a second computing node $210_2$. The first computing node $210_1$ includes a current processor $220_1$, and, the second computing node $210_2$ includes a new processor $220_2$. For purposes of explanation and not limitation, a single current processor $220_1$ and a single new processor $220_2$ are discussed. However, in some embodiments, the system 200 can include a plurality of current processors $220_1$ executing on one or more first computing nodes $210_1$ (e.g., currently executing computing node(s)) and a plurality of new processors $220_2$ executing one or more second computing nodes $210_2$ (e.g., newly created computing node(s) and/or currently executing computing node(s)).

In some embodiments, the scaling manager component 120 receives information instructing the scaling manager component 120 to scale down the system 200 by removing the first computing node $210_1$ and moving the current processor $220_1$ to the second computing node $210_2$ by creating the new processor $220_2$. When the current processor $220_1$ has been instructed to stop processing, the first computing node $210_1$ can be removed from the system 100.

In some embodiments, the scaling manager component 120 receives information instructing the scaling manager component 120 to scale up the system 200 by adding the second computing node $210_2$ to the system 100 and moving the current processor $220_1$ to the second computing node $210_2$ by creating the new processor $220_2$.

In some embodiments, the scaling manager component 120 can receive a request to scale the stream processing system 200. In some embodiments, the request can identify a node change of the current processor 220₁ (e.g., to be moved) executing on a first computing node 210₁ in a topology of the stream processing system 200. In some embodiments, the request provides information about a topology change, with the scaling manager component 120 identifying computing node(s) and/or processor(s) to be added and/or removed.

In response to the request to scale the stream processing system 200, the scaling manager component 120 can send a request to the current processor 220₁ (e.g., via an application programming interface (API)) to create a checkpoint that captures internal state of the current processor 220₁. In some embodiments, the checkpoint can include information regarding internal node field(s) and/or property(ies) including, for example, a node configuration, an injector, a local streaming topology, remote connection(s), and/or a restore coordinator. The scaling manager component 120 can then receive the checkpoint from the current processor 220₁.

The scaling manager component 120 can send a request to initiate the new processor 220₂ on the second computing node 210₂ (e.g., different than first computing node 210₁) in the topology of the system 200. In some embodiments, before sending the request to initiate the new processor 220₂, the scaling manager component 120 can startup/initiate the second computing node 210₂ (e.g., addition of second computing node 210₂ to the system 200).

Once the new processor 220₂ has been initiated on the second computing node 210₂, the scaling manager component 120 can send the received checkpoint information to the new processor 220₂. Thereafter, the scaling manager component 120 can send a request to stop processing to the current processor 220₁. The scaling manager component 120 can then send a request to start processing to the new processor 220₂.

In some embodiments, the current processor 220₁ can store the anchor and associated information in an ordered collection of anchors (e.g., chronologically organized table) stored in a journal for use by the new processor 220₂. In some embodiments, by storing the anchor and associated information in the journal, the system 200 can ensure exactly once processing of the streaming data, that is, no data is processed more than once, and all data is processed.

Thus, compared to existing scaling solutions which usually require full system restart and offline time, the system 200 can allow the parts of the system not affected by the scaling operation (e.g., processor(s)) to continue to operate without interruption while the moved processor(s) are able to recover with minimum delay and resume working relying on the streaming protocol and checkpoint(s).

In some embodiments, a new topology generated by the scaling operation can be created by various parameter(s), for example, user input and/or live loading metrics. For example, if a certain branch of the system 200 has more load compared to other parts it can be scaled to another separate host machine (e.g., computing node).

The system 200 thus performs dynamic scaling of a data stream processing system (e.g., "exactly once" data stream processing system). Various parameter(s) (e.g., user-configurable capacity, real-time load metrics, and/or performance counters) can be used to dynamically scale in and/or scale out the "exactly once" data stream processing system without system restart. In some embodiments, delay introduced by this scaling operation can be minimized by utilizing a combination of mutable process topology (which can dynamically assign certain parts of the system to a new host machine) and controllable streaming processor movement with checkpoints and the streaming protocol controlled recovery which still enforces the "exactly once" metric.

FIGS. 3-6 illustrate exemplary methodologies relating to dynamic scaling for an "exactly once" data stream processing system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
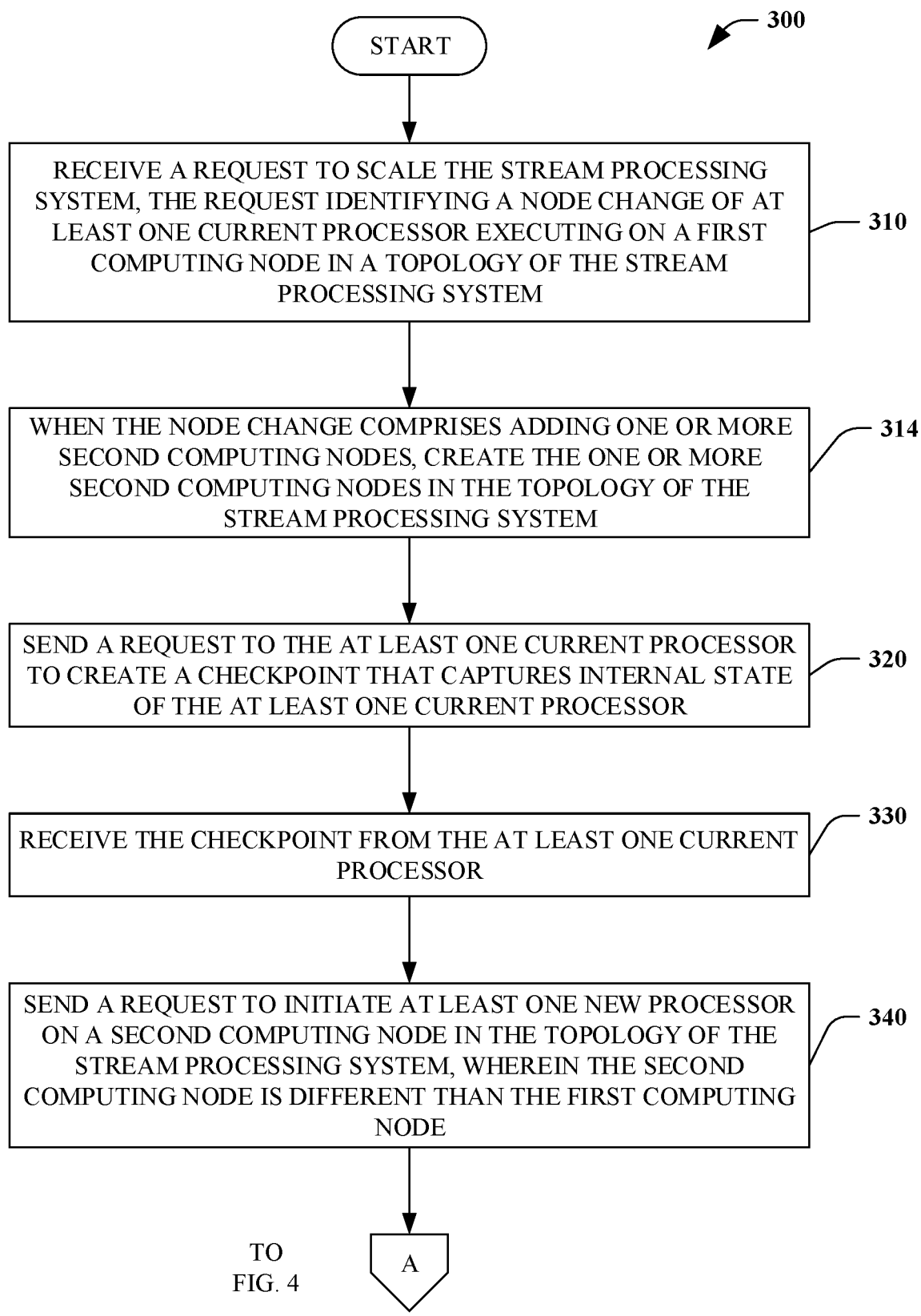
FIGS. 3 and 4 are a flow chart that illustrates a method of dynamically scaling of processor(s) of a stream processing system.
Figure 4:
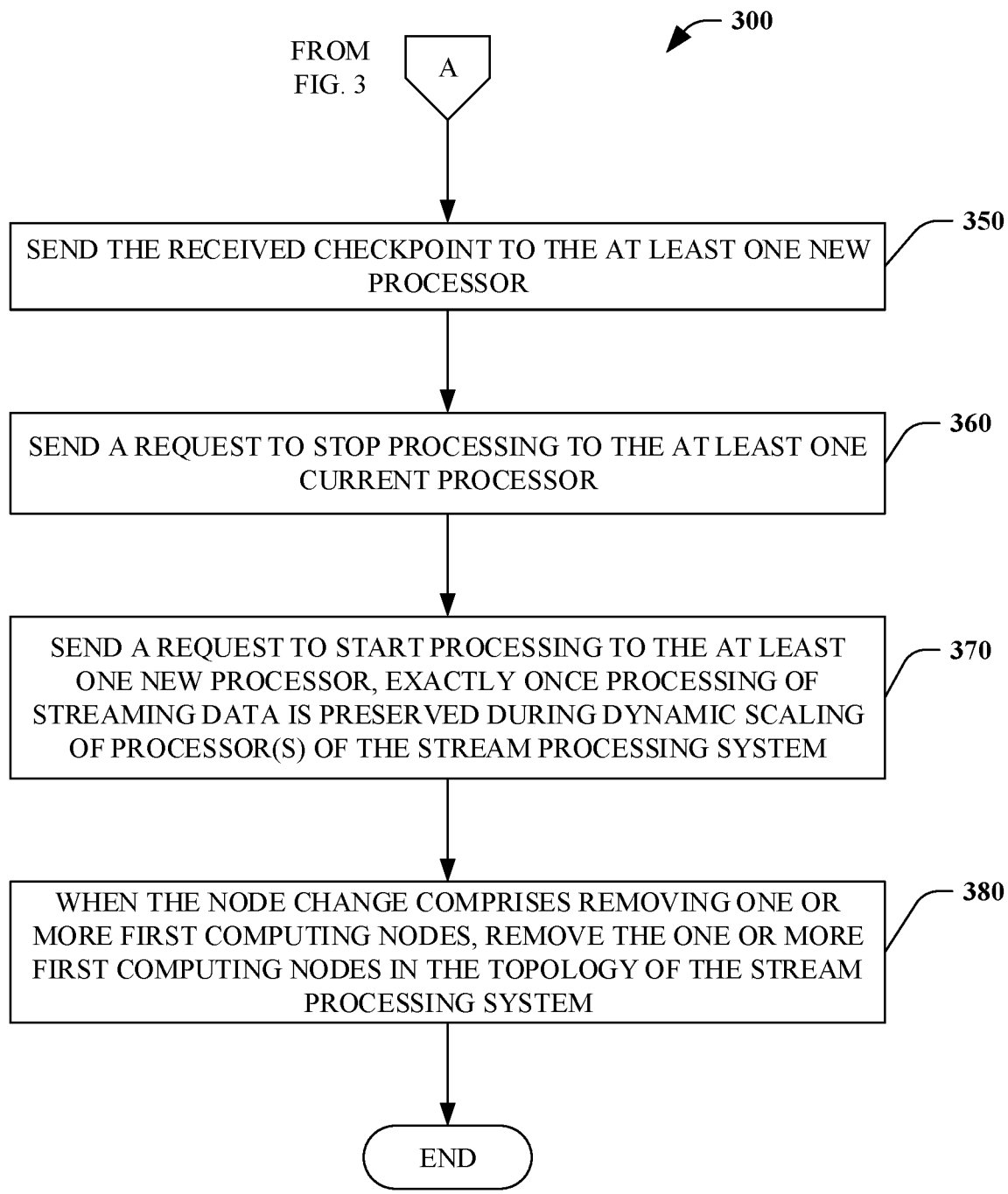

Referring to FIGS. 3 and 4, a method of dynamically scaling of processor(s) of a stream processing system 300 is illustrated. In some embodiments, the method 300 is performed by the scaling manager component 120.

At 310, a request to scale the stream processing system is received. The request identifies a node change of at least one current processor executing on a first computing node in a topology of the stream processing system. At 314, when the node change comprises adding one or more second computing nodes, create the one or more second computing nodes in the topology of the stream processing system.

At 320, a request is sent to the at least one current processor to create a checkpoint that captures internal state of the at least one current processor. At 330, the checkpoint is received from the at least one current processor.

At 340, a request to initiate at least one new processor on a second computing node in the topology of the stream processing system is sent. The second computing node is different than the first node.

At 350, the received checkpoint information is sent to the at least one new processor. At 360, a request to stop processing is sent to the at least one current processor. At 370, a request to start processing is sent to the at least one new processor. In some embodiments, exactly once processing of streaming data is preserved during the dynamic scaling of processor(s) of the stream processing system (e.g., steps 310-370). At 380, when the node change comprises removing one or more first computing nodes, remove the one or more first computing nodes in the topology of the stream processing system.

Figure 5:
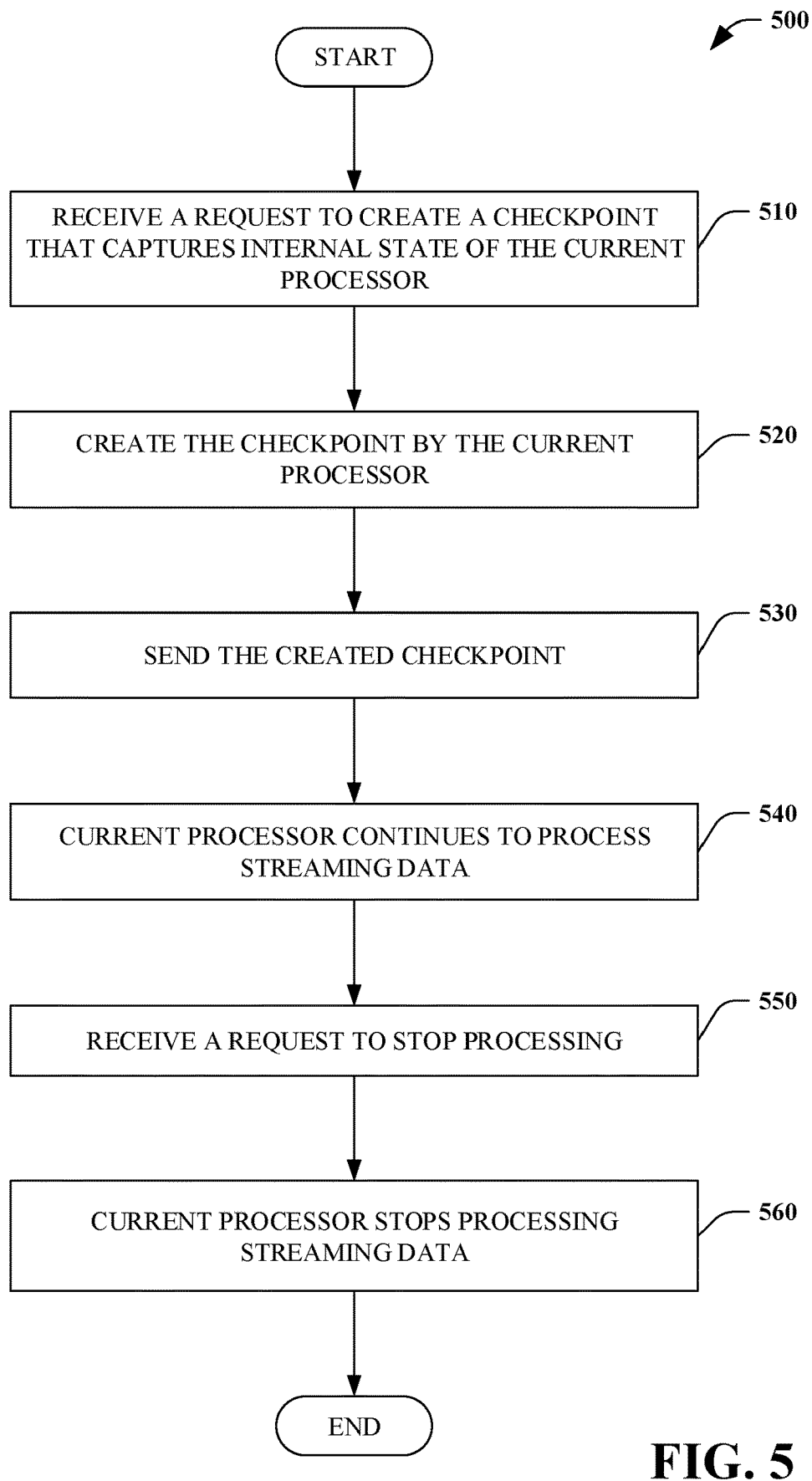
FIG. 5 is a flow chart that illustrates a method of dynamically scaling processor(s) of a stream processing system.

Turning to FIG. 5, a method of dynamically scaling processor(s) of a stream processing system 500 is illustrated. In some embodiments, the method 500 is performed by the current processor 220.

At 510, a request to create a checkpoint that captures internal state of the current processor is received (e.g., from the scaling manager component 120). At 520, the checkpoint is created by the current processor. At 530, the created checkpoint is sent (e.g., to the scaling manager component 120).

At 540, optionally, the current processor continues to process streaming data. At 550, a request to stop processing is received (e.g., from the scaling manager component 120). At 560, the current processor stops processing streaming data.

Figure 6:
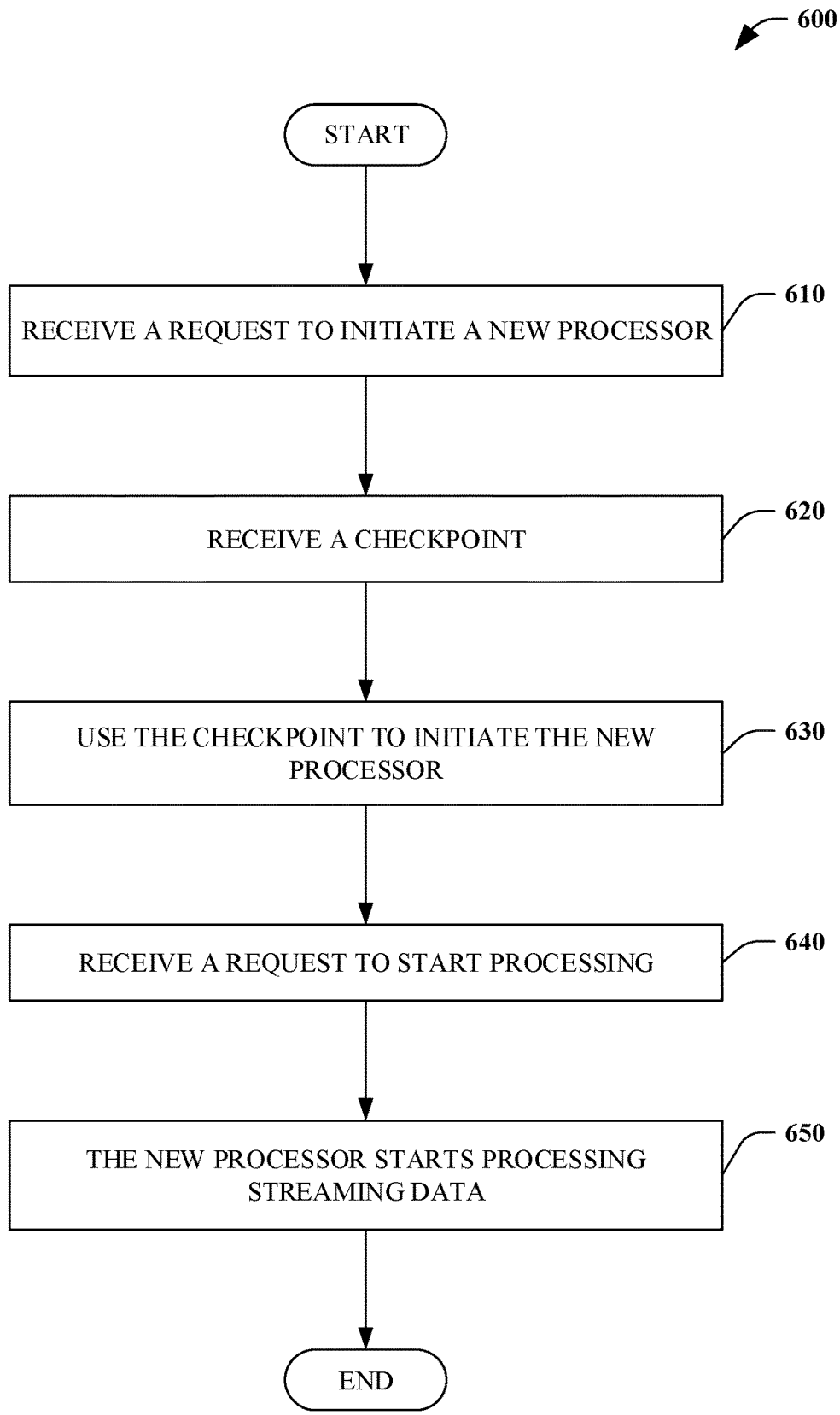
FIG. 6 is a flow chart that illustrates a method of dynamically scaling processor(s) of a stream processing system.

Referring to FIG. 6, a method of dynamically scaling processor(s) of a stream processing system 600 is illustrated. In some embodiments, the method 600 is performed by the second computing node $210_2$ and/or the new processor $230_2$.

At 610, a request to initiate a new processor is received (e.g., from the scaling manager component 120). At 620, a checkpoint is received (e.g., from the scaling manager component 120). At 630, the checkpoint is used to initiate the new processor (e.g., warmed up).

At 640, a request to start processing is received (e.g., from the scaling manager component 120). At 650, the new processor starts processing streaming data (e.g., at the point where the current processor stopped processing the streaming data).

Described herein is a system for dynamic scaling of a stream processing system, comprising: a processing system comprising a processor and a memory having computer-executable instructions stored thereupon which, when executed by the processor, cause the processing system to: receive a request to scale the stream processing system, the request identifying a node change of at least one current processor executing on a first computing node in a topology of the stream processing system; send a request to the at least one current processor to create a checkpoint that captures internal state of the at least one current processor; receive the checkpoint from the at least one current processor; send a request to initiate at least one new processor on a second computing node in the topology of the stream processing system, wherein the second computing node is different than the first computing node; send the received checkpoint to the at least one new processor; send a request to stop processing to the at least one current processor; and send a request to start processing to the at least one new processor, wherein exactly once processing of streaming data is preserved during dynamic scaling of the stream processing system.

The system can further include wherein the node change comprises adding a node to the topology of the stream processing system. The system can include the memory having further computer-executable instructions stored thereupon which, when executed by the processor, cause the processing system to send a request to start the added node. The system can further include wherein the node change comprises removing a node from the topology of the stream processing system.

The system can further include wherein the at least one current processor continues to process streaming data until receiving the request to stop processing. The system can further include wherein the at least one current processor stores information regarding processing of streaming data in a journal comprising an ordered collection of anchors. The system can further include wherein the at least one new processor utilizes the information stored in the journal to being processing of streaming data. The system can further include wherein the at least one current processor stops processing streaming data in response to receiving the request to create the checkpoint.

Described herein is a method of dynamically scaling of processor(s) of a stream processing system, comprising: receiving a request to scale the stream processing system, the request identifying a node change of at least one current processor executing on a first computing node in a topology of the stream processing system; sending a request to the at least one current processor to create a checkpoint that captures internal state of the at least one current processor; receiving the checkpoint from the at least one current processor; sending a request to initiate at least one new processor on a second computing node in the topology of the stream processing system, wherein the second computing node is different than the first computing node; sending the received checkpoint to the at least one new processor; sending a request to stop processing to the at least one current processor; and sending a request to start processing to the at least one new processor, wherein exactly once processing of streaming data is preserved during the dynamic scaling of processor(s) of the stream processing system.

The method can further include wherein the node change comprises adding a node to the topology of the stream processing system. The method can further include sending a request to start the added node. The method can further include wherein the node change comprises removing a node from the topology of the stream processing system.

The method can further include wherein the at least one current processor continues to process streaming data until receiving the request to stop processing. The method can further include wherein the at least one current processor stores information regarding processing of streaming data in a journal comprising an ordered collection of anchors. The method can further include wherein the at least one new processor utilizes the information stored in the journal to being processing of streaming data. The method can further include wherein the at least one current processor stops processing streaming data in response to receiving the request to create the checkpoint.

Described herein is a computer storage media storing computer-readable instructions that when executed cause a computing device to: receive a request to scale the stream processing system, the request identifying a node change of at least one current processor executing on a first computing node in a topology of the stream processing system; send a request to the at least one current processor to create a checkpoint that captures internal state of the at least one current processor; receive the checkpoint from the at least one current processor; send a request to initiate at least one new processor on a second computing node in the topology of the stream processing system, wherein the second computing node is different than the first computing node; send the received checkpoint to the at least one new processor; send a request to stop processing to the at least one current processor; and send a request to start processing to the at least one new processor, wherein exactly once processing of streaming data is preserved during dynamic scaling of the stream processing system.

The computer storage media can further include wherein the node change comprises adding a node to the topology of the stream processing system. The computer storage media can further include wherein the node change comprises removing a node from the topology of the stream processing system. The computer storage media can further include wherein the at least one current processor continues to process streaming data until receiving the request to stop processing.

Figure 7:
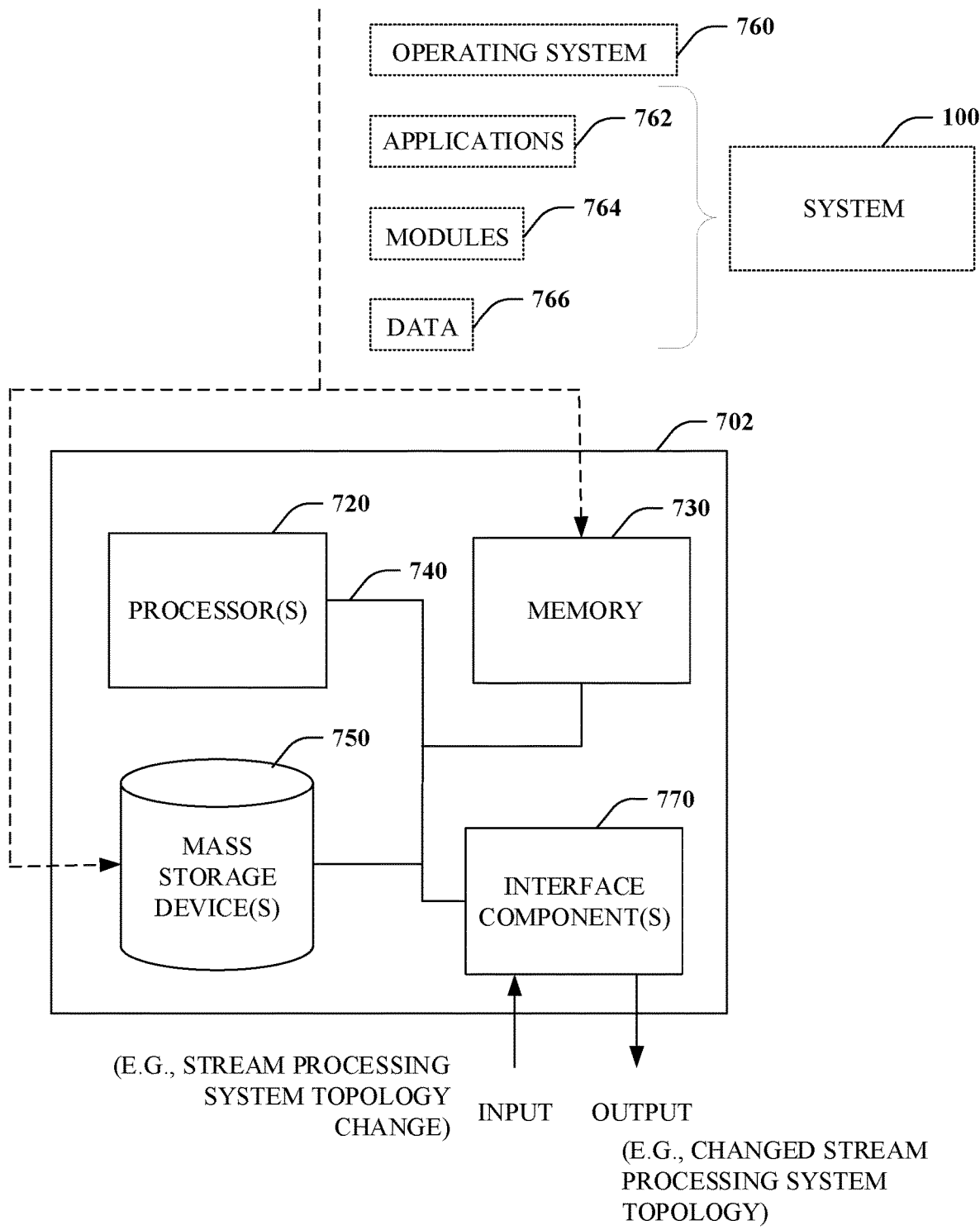
FIG. 7 is a functional block diagram that illustrates an exemplary computing system.

With reference to FIG. 7, illustrated is an example general-purpose processing system, computer or computing device 702 (e.g., mobile phone, desktop, laptop, tablet, watch, server, hand-held, programmable consumer or industrial electronics, set-top box, game system, compute node, etc.). For instance, the computing device 702 may be used in a system for dynamic scaling of a data stream processing system 100 and/or a system for dynamic scaling of a data stream processing system 200.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device(s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   a memory having computer-executable instructions stored thereupon which, when executed by the at least one processor, cause the computing system to:
   receive a request to scale a stream processing system, the request identifying a node change of at least one current processor executing on a first computing node in a topology of the stream processing system;
   send a request to the at least one current processor to create a checkpoint that captures internal state of the at least one current processor when processing streaming data, the at least one current processor having completed processing the streaming data up to a point identified by a particular anchor;
   receive the checkpoint from the at least one current processor;
   send a request to initiate at least one new processor on a second computing node in the topology of the stream processing system, wherein the second computing node is different than the first computing node;
   send the received checkpoint to the at least one new processor;
   send a request to stop processing to the at least one current processor; and
   send a request to start processing to the at least one new processor, wherein the at least one new processor resumes processing the streaming data from the point identified by the particular anchor to ensure that exactly once processing of at least some of the streaming data is preserved during dynamic scaling of the stream processing system.

2. The computing system of claim 1, wherein the node change comprises adding the second computing node to the topology of the stream processing system.

3. The computing system of claim 2, wherein the particular anchor is a pointer to a particular batch of the streaming data.

4. The computing system of claim 1, wherein the node change comprises removing the first computing node from the topology of the stream processing system.

5. The computing system of claim 1, wherein the at least one current processor continues to process the streaming data until receiving the request to stop processing.

6. The computing system of claim 5, wherein the at least one current processor stores information regarding processing of the streaming data in a journal comprising an ordered collection of anchors including at least the particular anchor and one other anchor.

7. The computing system of claim 6, wherein the at least one new processor utilizes particular information stored in the journal pertaining to the particular anchor to begin processing of the streaming data.

8. The computing system of claim 1, wherein the at least one current processor stops processing the streaming data in response to receiving the request to create the checkpoint.

9. A method, comprising:
   receiving a request to scale a stream processing system, the request identifying a node change of at least one current processor executing on a first computing node in a topology of the stream processing system;
   sending a request to the at least one current processor for a checkpoint that captures internal state of the at least one current processor when processing streaming data, the at least one current processor having completed processing the streaming data up to a point identified by a particular anchor;
   receiving the checkpoint from the at least one current processor;
   sending a request to initiate at least one new processor on a second computing node in the topology of the stream processing system, wherein the second computing node is different than the first computing node;
   sending the received checkpoint to the at least one new processor;
   sending a request to stop processing to the at least one current processor; and
   sending a request to start processing to the at least one new processor, wherein the at least one new processor resumes processing the streaming data from the point identified by the particular anchor to ensure that exactly once processing of at least some of the streaming data is preserved during dynamic scaling of the stream processing system.

10. The method of claim 9, wherein the node change comprises adding the second computing node to the topology of the stream processing system.

11. The method of claim 10, wherein the particular anchor is a pointer to a particular batch of the streaming data.

12. The method of claim 9, wherein the node change comprises removing the first computing node from the topology of the stream processing system.

13. The method of claim 9, wherein the at least one current processor continues to process the streaming data until receiving the request to stop processing.

14. The method of claim 13, wherein the at least one current processor stores information regarding processing of the streaming data in a journal comprising an ordered collection of anchors.

15. The method of claim 14, wherein the at least one new processor utilizes particular information stored in the journal pertaining to the particular anchor to begin processing of the streaming data.

16. The method of claim 9, wherein the at least one current processor stops processing the streaming data in response to receiving the request to create the checkpoint.

17. A computer storage media storing computer-readable instructions that, when executed, cause a computing device to:
   receive a request to scale a stream processing system, the request identifying a node change of at least one current processor executing on a first computing node in a topology of the stream processing system;

send a request to the at least one current processor to create a checkpoint that captures internal state of the at least one current processor when processing streaming data, the at least one current processor having completed processing the streaming data up to a point identified by a particular anchor;

receive the checkpoint from the at least one current processor;

send a request to initiate at least one new processor on a second computing node in the topology of the stream processing system, wherein the second computing node is different than the first computing node;

send the received checkpoint to the at least one new processor;

send a request to stop processing to the at least one current processor; and send a request to start processing to the at least one new processor, wherein the at least one new processor resumes processing the streaming data from the point identified by the particular anchor to ensure that exactly once processing of at least some of the streaming data is preserved during dynamic scaling of the stream processing system.

18. The computer storage media of claim 17, wherein the node change comprises adding the second computing node to the topology of the stream processing system.

19. The computer storage media of claim 17, wherein the node change comprises removing the first computing node from the topology of the stream processing system.

20. The computer storage media of claim 17, wherein the at least one current processor continues to process the streaming data until receiving the request to stop processing.

* * * * *